United States Patent
Simske et al.

(10) Patent No.: US 7,916,863 B2
(45) Date of Patent: Mar. 29, 2011

(54) SECURITY PRINTING METHOD AND SYSTEM FOR ENHANCING SECURITY PRINTING

(75) Inventors: Steven J. Simske, Fort Collins, CO (US); David Orr, Philomath, OR (US); Lonnie D. Mandigo, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 727 days.

(21) Appl. No.: 11/948,661

(22) Filed: Nov. 30, 2007

(65) Prior Publication Data

US 2009/0141892 A1 Jun. 4, 2009

(51) Int. Cl.
*G09C 3/00* (2006.01)
*H04L 9/00* (2006.01)

(52) U.S. Cl. ............ 380/55; 713/168; 713/179; 713/181
(58) Field of Classification Search ............. 380/55; 713/160–162, 165–170, 175–176, 179–181; 705/62, 26–27, 30–31; 726/26–27, 30–31; 382/100
See application file for complete search history.

(56) References Cited

U.S. PATENT DOCUMENTS

| | | | |
|---|---|---|---|
| 7,177,424 B1 | 2/2007 | Furuya et al. | |
| 7,200,549 B1 | 4/2007 | Fujii et al. | |
| 7,240,181 B2* | 7/2007 | Haas et al. | 711/216 |
| 7,539,727 B2* | 5/2009 | Miller et al. | 709/206 |
| 2003/0152219 A1 | 8/2003 | Coppersmith et al. | |
| 2007/0101140 A1 | 5/2007 | Rhoads | |
| 2007/0162753 A1 | 7/2007 | Nakano et al. | |
| 2007/0189524 A1 | 8/2007 | Rogaway | |
| 2007/0195952 A1 | 8/2007 | Singanamala | |
| 2007/0198520 A1 | 8/2007 | McKenney et al. | |

* cited by examiner

*Primary Examiner* — Hosuk Song

(57) ABSTRACT

A security printing method includes generating a security file having a plurality of metadata fields and an information field concatenated together in an initial sequence. A security file identification is generated from the plurality of metadata fields and the information field. The security file identification corresponds to the initial sequence and is a one-way function of the plurality of metadata fields and the information field. The method further includes selecting a custom scrambling technique based on the security file identification, and scrambling the initial sequence using the selected custom scrambling technique, thereby creating a scrambled sequence of the plurality of metadata field and the information field.

24 Claims, 3 Drawing Sheets

SECURITY PRINTING METHOD AND SYSTEM FOR ENHANCING SECURITY PRINTING

BACKGROUND

The present disclosure relates generally to a security printing method and a system for enhancing security printing.

Security printing and publishing is an important component of document security, tracking and authenticating, as well as of anti-counterfeiting initiatives. Security printing may involve protecting salient information on the document via secure means. Such secure means may include hashing the information in fields to prevent surreptitious alteration.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Embodiments of the method and system advantageously enable the use of a security file identification (i.e., hash) with a scrambled security file without providing a clue to the casual observer or a counterfeiter as to how the security file identification is generated. The method and system disclosed herein effectively blur the fields of the security file without the need for longer hashes and/or more sophisticated non-exportable encryption approaches. Furthermore, the scrambling technique selected for the security file is advantageously customizable to an individual user (e.g., company, licensee, customer, etc.) substantially without compromising the algorithm for another customer. Still further, the system may, in some instances, require the use of a single secure service provider (e.g., a single URL for access) during the creation of the security file and the authentication of the security file, thereby requiring a would-be counterfeiter to successfully attack (or spoof) the system both during creation and validation (which may take place at multiple locations). Without being bound to any theory, it is believed that these aspects, taken alone or in any combination, render reverse engineering of the security file substantially more difficult.

Figure 1:
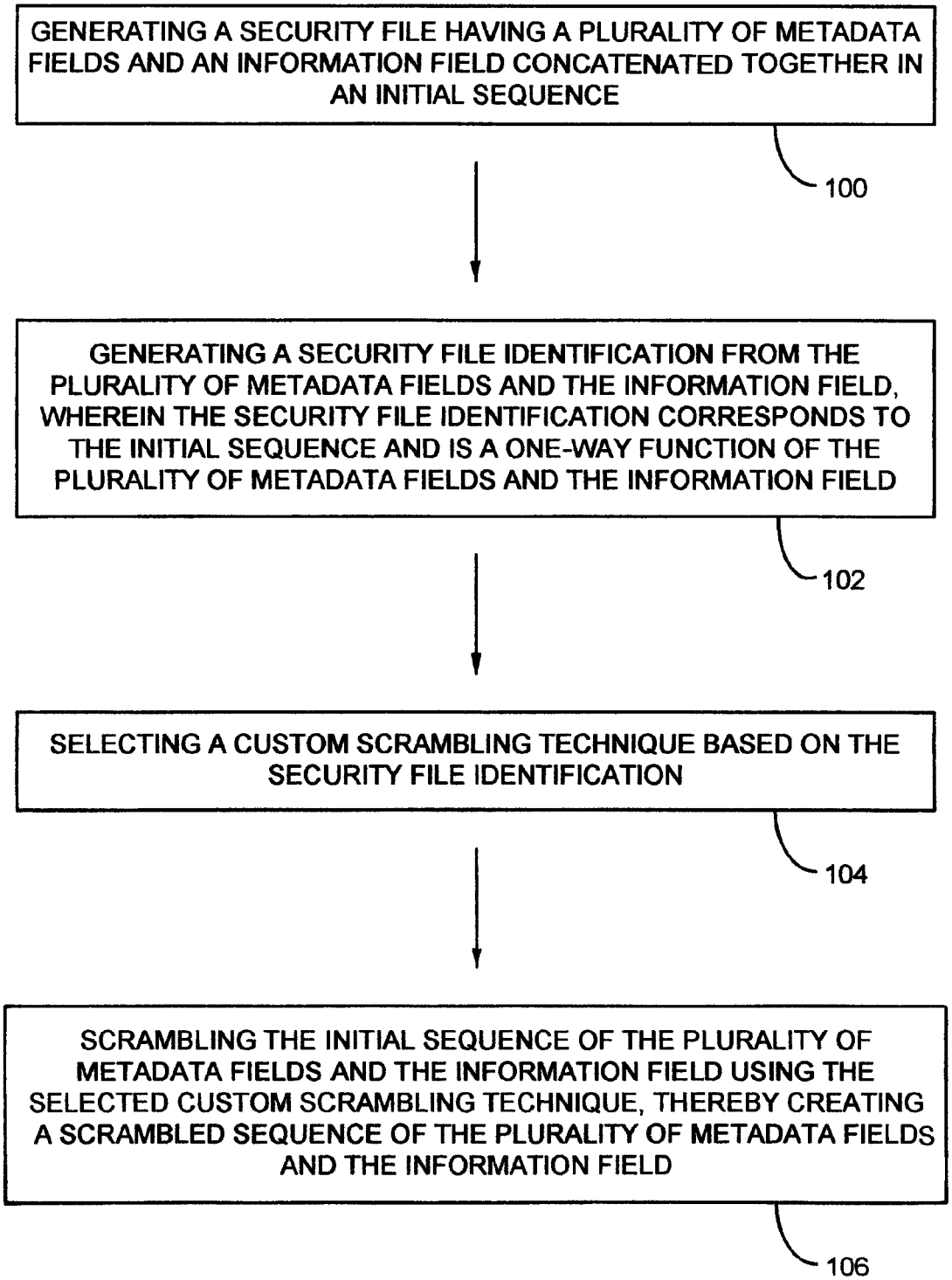
FIG. 1 is a flow diagram depicting an embodiment of a security printing method.

Referring now to FIG. 1, an embodiment of the security printing method is depicted. Generally, the method includes generating a security file having a plurality of metadata fields and an information field concatenated together in an initial sequence, as shown at reference numeral 100; generating a security file identification from the plurality of metadata fields and the information field, wherein the security file identification corresponds to the initial sequence and is a one-way function of the plurality of metadata fields and the information field, as shown at reference numeral 102; selecting a custom scrambling technique based on the security file identification, as shown at reference numeral 104; and scrambling the initial sequence of the plurality of metadata fields and the information field using the selected custom scrambling technique, thereby creating a scrambled sequence of the plurality of metadata field and the information field, as shown at reference numeral 106. It is to be understood that this and other embodiments of the method are discussed further hereinbelow.

Figure 2:
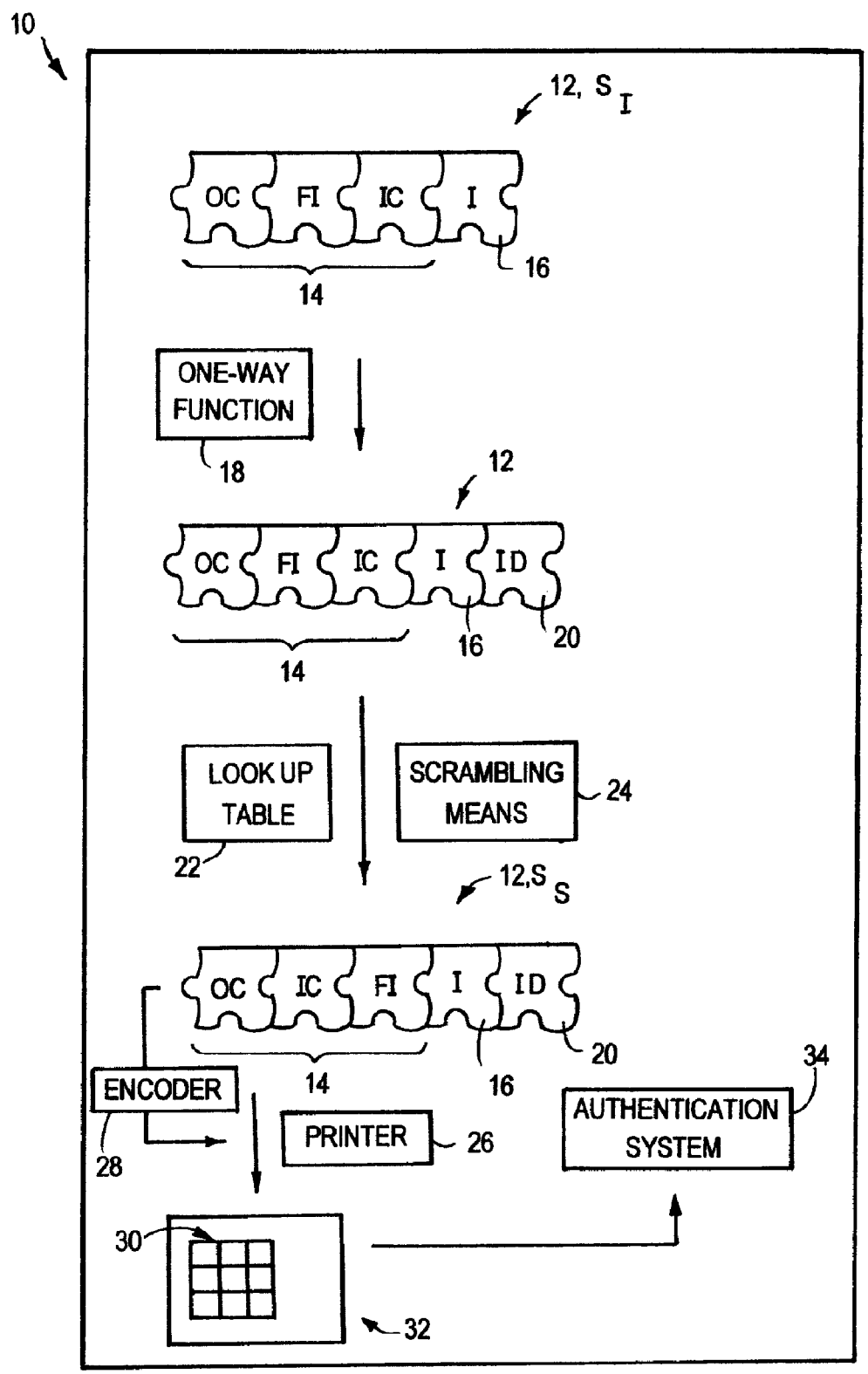
FIG. 2 is a schematic diagram depicting an embodiment of a system for enhancing security printing.

FIG. 2 depicts an embodiment of the system 10 for enhancing security printing. The system 10 includes means for generating a security file 12 having a plurality of metadata fields 14 and an information field 16 concatenated together in an initial sequence $S_I$. In one non-limiting example, the security file 12 is generated using a computer or enterprise computing system 36 (see FIG. 3) and programs or software 40 (see FIG. 3) configured to build the security file 12. As used herein, the term "enterprise computing system" means a network of interconnected computers, including virtualized and/or redundant processors, banks of processors and/or servers, etc. It is to be understood that the components of the system 10 may be implemented in a consolidated location, or portion(s) of the system 10 may be implemented at different locations.

Figure 3:
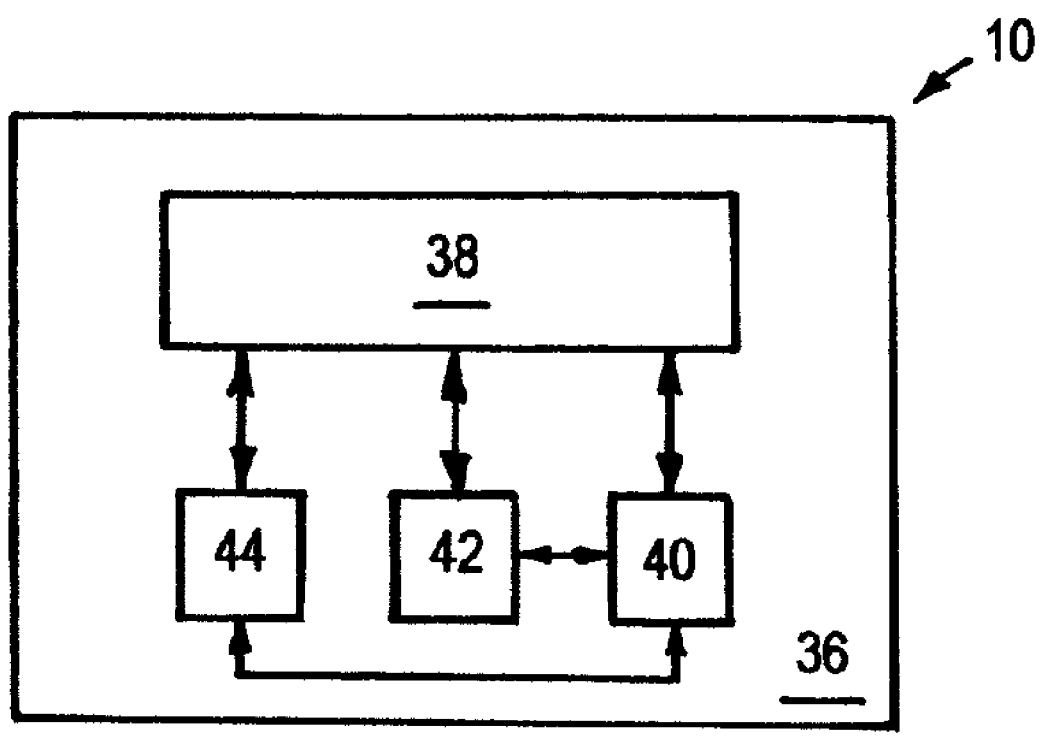
FIG. 3 is a schematic diagram depicting an embodiment of some system components.

FIG. 3 depicts a schematic diagram of some of the system 10 components, including those used to build the security file 12. The computer or enterprise computing system 36 includes suitable hardware 38 and software 40 for building the security file 12. The hardware 38 includes an electronic processing device, such as, for example, a controller, a micro controller, a microprocessor, a host processor, and/or an application specific integrated circuit (ASIC). It is to be understood that the electronic processing device may be a processor working in conjunction with a central processing unit (CPU) performing the function of a general-purpose processor.

Computer program(s) and/or software 40 (e.g., computer readable code) may be loaded onto the computer or enterprise computing system 36, and stored in a memory 42 thereof. Such programs and/or software 40 are executable via the processing device. Examples of such programs(s) and/or software 40 include those configured to perform one way functions, those which provide scrambling look up tables, those configured to scramble fields of a security file 12, and those configured to perform or provide any other desirable service/function.

The system 10 also includes one or more algorithms 44 that are executable via the electronic processing device. Such algorithms 44 are incorporated into the computer or enterprise computing system 36 and/or into the software 40. Generally, information is interpreted and written to the metadata fields 14 by one or more of the algorithms 44.

Referring back to FIG. 2, it is to be understood that the security file 12 may include any number of metadata fields 14. The embodiment shown in FIG. 2 includes three metadata fields, including an operator credentials field (labeled OC), a forensic information field (labeled FI), and an institutional credentials field (labeled IC). Any other number of fields may be included, such as, for example location, machine identifier, date stamp, time stamp, provenance record for the document, or the like.

The information making up the operator credentials field may be supplied by the computer operator. In one non-limiting example, the operator supplies his/her credentials by inserting his/her smart card into the computer 36. In another non-limiting example, the operator may access a file that has his/her credentials stored therein. Such a file may be accessed, for example, via a password, biometrics, challenge/response (i.e., question and answer), possession of another securing device (e.g., RFID), or any combination thereof. The computer 36 receives the information and creates, for example, the first metadata field 14 in the security file 12.

The information making up the forensic information field may be supplied by the system. This information is used to assure that the local computer 36 and/or software 40 has not been altered. Commercially available algorithms such as, for example, TPVS's (located in Budapest and Szeged, Hungary) universal program encryption technology or Cloakware's (located in Vienna, Va.) security suite may be incorporated into the computer 36 and software 40 for this purpose. In the embodiment shown in FIG. 2, the forensic information field is the second metadata filed 14 in the security file 12.

The computer or enterprise computing system 36 supplies institutional credentials, which become the third metadata field 14 in the security file 12 shown in FIG. 2.

As the operator builds the security file 12 using the computer or enterprise computing system 36, software 40 stored therein automatically extracts relevant information. This information becomes the information field 16 of the security file 12. Non-limiting examples of such relevant information include names, monetary amounts, case identifiers, parties involved, dates, or the like, or combinations thereof. Collectively, such relevant information makes up indices or salient data on a document (i.e., any information that may be referenced, acted upon, etc.).

The computer or enterprise computing system 36 concatenates the various metadata fields 14 and the information field 16 together to form the security file 12. In one embodiment, the computer or enterprise computing system 36 automatically generates the initial sequence $S_I$ of the security file 12. In other embodiments, the operator may select the initial sequence $S_I$ of the security file 12, or the initial sequence $S_I$ may correspond or be tied to operator credentials. It is to be understood that the operator credentials may or may not occur in the same order in the initial sequence $S_I$.

The system 10 further includes a one-way function 18 used to create the security file identification 20 (i.e., hash-as nonce). The security file 12 (including the metadata fields 14 and the information field 16) is passed through the one-way function 18, which produces a unique number based on the information in the security file. The generated number is generally unique, however, it is to be understood that there is a 1 in $2^N$ chance of a "hash collision," where the generated number corresponds to another "unique" number previously generated for another security file 12 and/or where the same algorithm is used for scrambling the salient fields, 14, 16. It is to be understood, however, that the salient fields 14, 16 themselves will hold different data for different documents, so a hash collision does not deleteriously affect the system 10.

This unique number is the security file identification 20 of the security file 12. The security file identification 20 corresponds to the initial sequence $S_I$ of the security file 12 as it is based on the metadata and information fields 14, 16 as originally created.

In an embodiment, the system 10 further comprises a program or software 40 for hashing, digesting and/or encrypting the security file 12. It is to be understood that such processes may occur prior to or subsequent to scrambling the security file 12 (discussed further hereinbelow). In a non-limiting example, the metadata fields 14 and information field 16 are encrypted using 40, 128, 256 or 512 bit DES.

It is to be understood that the security file identification 20 may be appended to the security file 12 (as shown in FIG. 2) prior to or subsequent to hashing, digesting and/or encrypting.

The system 10 further includes a look up table 22 for selecting a custom scrambling technique. Generally, the security file identification 20 is used as an entry in the look up table 22 to determine the custom scrambling technique. More specifically, the bit sequence in the security file identification 20 is used to access one or more pre-defined scrambling techniques. It is to be understood that the number of scrambling possibilities (techniques) is equal to the number of possible security file identifications 20, and as such, the scrambling algorithm is uniquely identified by the security file identification 20.

The system 10 automatically selects one of the pre-defined scrambling techniques that will be used (by a means for scrambling 24) to scramble the initial sequence $S_I$ of the security file 12. It is to be understood that the scrambling technique is selected by the system 10, in part, because the result of the sequence of hashes is used as a nonce for the scrambling. The selected scrambling technique is applied to the bits in the metadata and information fields 14, 16, thereby scrambling the initial sequence $S_I$ of the security file 12 and forming a scrambled sequence $S_S$ of the security file 12. The scrambled (and potentially hashed, digested and/or encrypted) sequence $S_S$ may be written, printed and/or encoded in place of the initial sequence $S_I$. It is to be understood that the security file identification 20 does not correspond to the scrambled sequence $S_S$, but instead corresponds to the descrambled sequence (i.e., the initial sequence $S_I$).

Very generally, if the security file includes F number of fields 14, 16, there are F! (F factorial) methods to order the blocks of data within the fields 14, 16. As a non-limiting example, with four fields 14, 16, there are 4×3×2×1 (or 24) ordering methods.

Furthermore, a variety of different scrambling techniques may be used. Non-limiting examples of such techniques include sequential ordering within each block, reverse ordering in each block, odd bits first and then even bits, or even bits first and then odd bits. As another non-limiting example, for each of the F fields 14, 16, scrambling the blocks may occur in different chunk sizes. For simplicity, chunks may be in sizes of 4, 8, 16 . . . $2^N$. If each field 14, 16 is 256 bits, then N=8, and 7 different chunk sizes are available (i.e., N-1=number of different chunk sizes). It is to be understood that the chunks within each block may be further sequenced. The number of possibilities for sequencing each chunk will depend on the size of the respective chunk, and will range from 1 to (N-1)!. Other variants on scrambling include swapping two chunks or blocks within the security file 12.

It is to be understood that scrambling techniques are reversible and do not constitute a new encryption mechanism or a new hashing algorithm. As such, the scrambling techniques are exportable. The scrambling technique may also advantageously be customized for an individual/company/licensee/customer, and the algorithm revealed to a validating entity without compromising the algorithm for another individual/company/licensee/customer. This is due, at least in part, to the fact that the population of scrambling techniques is much greater than the number of possible security file identifications 20.

As a non-limiting example, the following description illustrates how a 40-bit security file identification 20 of a security file 12 having 4 fields 14, 16 (each 256 bits) may be computed. For each of the 4 fields (3 metadata fields 14 and 1 information field 16), four equally-sized (64 bit) blocks are created. Each block is scrambled in one of four ways as previously described (e.g., sequential ordering within each block, reverse ordering in each block, odd bits first and then even bits, or even bits first and then odd bits). As such, there are 2 bits to indicate each scrambling, and 4 sets of 2 bits per field 14, 16. For the 4 fields 14, 16, then, this equals 32 bits.

Each of the 4 fields 14, 16 as defined after block scrambling may be re-scrambled by swapping, for example, blocks 1 and 3, and separately blocks 2 and 4 (bit=0); or by swapping, for example, blocks 1 and 4, and separately blocks 2 and 3 (bit=1). It is to be understood that this requires four bits, one for each field 14, 16.

The fields 14, 16 themselves may then be scrambled using 4 bits to represent 16 of the 24 possible permutations for their ordering. These include 1234, 1243, 1324, 1342, 1423, 1432, 2134, 2143, 2314, 2341, 2413, 2431 . . . 4321. In this non-limiting example, the mapping shown in Table 1 occurs (these are the first 16 possibilities out of the 24 orderings that do not have more than two fields 14, 16 in sequence or reverse sequence (4312 is not included to avoid redundancies).

TABLE 1

Example of Mapping for Scrambled Fields

| 4 Bit Value | Ordering of Fields 1-4 |
|---|---|
| 0000 | 1324 |
| 0001 | 1342 |
| 0010 | 1423 |
| 0011 | 2134 |
| 0100 | 2143 |
| 0101 | 2314 |
| 0110 | 2413 |
| 0111 | 2431 |
| 1000 | 3124 |
| 1001 | 3142 |
| 1010 | 3241 |
| 1011 | 3412 |
| 1100 | 3421 |
| 1101 | 4132 |
| 1110 | 4213 |
| 1111 | 4231 |

By the end of the scrambling, the data in the fields 14, 16 is greatly changed. As shown in FIG. 2, the field 14, 16 scrambling is illustrated by the swapping of the forensic information field 14, FI with the institutional credentials field 14, IC. As previously mentioned, the scrambled sequence $S_S$ generally has no relationship to the security file identification 20 (i.e., hash-as-nonce) that corresponds to the initial sequence $S_I$, as such, the data used to create the hash-as-nonce is no longer printed with the hash-as-nonce. Without being bound to any theory, it is believed that this renders reverse-engineering more difficult than trying to crack the hashing algorithm, and allows the operator to use an exportable (and shorter) hash, thereby saving printing real estate and meeting export restrictions, where applicable.

The security file identification 20 and the scrambled sequence $S_S$ may then be sent to a printer 26 to be written on an object 32. As previously mentioned, the security file identification 20 and scrambled sequence $S_S$ do not directly correspond to one another, and thus it may be desirable to print one or both of them on an object 32 without further encoding. It is to be understood that the term "object" as used herein is to be interpreted broadly and may include, but is not limited to any type of object, product, document or package. Likewise, the term "package" is to be interpreted broadly herein to include any unit for containing a product, displaying a product, or otherwise identifying a branded good. Non-limitative examples of such packages include boxes, bags, containers, clamshells, bands, tape, wraps, ties, bottles, vials, dispensers, inserts, other documents, or the like, or combinations thereof.

FIG. 2 illustrates an embodiment of the object 32 having a security deterrent 30 (encoded with the security file identification 20 and the scrambled sequence $S_S$) established thereon. As such, the system 10 may further include an encoder or encoding system 28 for encoding the security file identification 20 and/or the scrambled sequence $S_S$ in one or more security deterrents 30. It is to be understood that the security file identification 20 and the scrambled sequence $S_S$ may be encoded in the same deterrent 30 or in different deterrents 30. Furthermore, the security file identification 20 may be encoded both in a deterrent 30 in which the scrambled sequence $S_S$ is encoded, and in a separate deterrent 30.

Examples of suitable security deterrents 30 include, but are not limited to color bars, color tiles, guilloche patterns, concentric black/white rectangle patterns, 2-dimensional barcodes, modulation transfer function (MTF) patterns, tile patterns, color lines, fingerprint patterns, color text, copy detection patterns (CDP), letter sequences, number sequences, graphic sequences, target patterns, or the like, or combinations thereof. Generally, any glyph/mark that comes from a set of 2 or more possibilities may be used.

When a user wishes to validate the object 32, an authentication system 34 may be used. It is to be understood that the product/object 32 containing the printed security file identification 20 and scrambled sequence $S_S$ may be authenticated at any point after the product/object 32 is received. As non-limiting examples, a retailer, a consumer, or an inspector may initiate authentication. The authentication system 34 used is capable of reading the security file identification 20, determining the custom scrambling technique that was used, and descrambling the scrambled sequence $S_S$. It is to be understood that if the same secure service provider is used both for the creation and authentication of the security file 12, descrambling the scrambled sequence $S_S$ may be accomplished directly from the security file identification 20. For example, the secure service provider may be used to replace the original hashed fields 14, 16 with their scrambled version (i.e., scrambled sequence $S_S$) after using the final hash as a nonce for the scrambling technique, and then to descramble the fields 14, 16. In one embodiment, the recovered data may be directly compared to the initial sequence $S_I$ of the information in the metadata fields 14 and information field 15 stored with the secure service provider. In another embodiment, the recovered data may be compared to the values for them directly on the document (i.e., does the salient data (e.g., names, dates, etc.) match the data on the original document?). The latter embodiment may be applicable when the data printed on the document is in the original hashed fields (see, for example, the information field I, 16 of the security file 12 in FIG. 2).

The security file identification 20 is read via a suitable device. The technique and equipment used to read the security file identification 20 will depend, at least in part, on whether the security file identification 20 is encoded and the type of security deterrent 30 in which it is encoded. For example, if the security file identification 20 is encoded into a 2D barcode, a scanner is used to read the barcode and obtain the security file identification 20.

Once the security file identification 20 is read, the scrambling technique may be accessed. The scrambling technique is reversible, so the algorithm for scrambling implicitly stores the algorithm for unscrambling. As long as the secure service provider providing the original scramble is in communication with the secure service provider providing the descramble, the operator will be able to obtain the initial sequence $S_I$ using the hash-as-nonce and asking for the initial sequence $S_I$ from the scrambled sequence $S_S$. The scrambled sequence $S_S$ is then descrambled per the inverse of the scrambling technique, thereby revealing the initial sequence $S_I$.

If the initial sequence $S_I$ was encrypted, the user or validating entity may decrypt the initial sequence $S_I$ per available public or private key decryption.

In one embodiment and as previously alluded to, the system 10 disclosed herein may require the user/operator to connect to a secure service provider (not shown) during the generation of the security file 12, the generation of the security file identification 20, and the scrambling of the initial sequence $S_I$. The system 10 may also require the user/validating entity to connect to the secure service provider during object 32 authentication. It is believed that this type of system 10 requires a would-be counterfeiter to attack the system 10 both during creation and validation.

While several embodiments have been described in detail, it will be apparent to those skilled in the art that the disclosed embodiments may be modified. Therefore, the foregoing description is to be considered exemplary rather than limiting.

What is claimed is:

1. A security printing method, comprising:
   generating a security file having a plurality of metadata fields and an information field concatenated together in an initial sequence;
   generating a security file identification from the plurality of metadata fields and the information field, wherein the security file identification corresponds to the initial sequence and is a one-way function of the plurality of metadata fields and the information field;
   selecting a custom scrambling technique based on the security file identification; and
   scrambling the initial sequence of the plurality of metadata fields and the information field using the selected custom scrambling technique, thereby creating a scrambled sequence of the plurality of metadata fields and the information field.

2. The method as defined in claim 1 wherein the information field is generated by extracting information from the plurality of metadata fields.

3. The method as defined in claim 1, further comprising at least one of hashing, digesting, or encrypting the plurality of metadata fields and the information field prior to scrambling or subsequent to scrambling.

4. The method as defined in claim 1, further comprising appending the security file identification to the information field prior to scrambling.

5. The method as defined in claim 1, further comprising printing the security file identification and the scrambled sequence at one or more predetermined locations on an object.

6. The method as defined in claim 5 wherein the security file identification is appended to the scrambled sequence.

7. The method as defined in claim 5, further comprising authenticating the object by:
   reading the security file identification;
   determining the custom scrambling technique from the security file identification; and
   descrambling the scrambled sequence of the plurality of metadata fields and the information field, thereby revealing the initial sequence of the plurality of metadata fields and the information field.

8. The method as defined in claim 7 wherein the plurality of metadata fields and the information field are encrypted, and wherein after descrambling, the method further comprises decrypting the encrypted plurality of metadata fields and information field.

9. The method as defined in claim 7, further comprising:
   requiring a user to connect to a secure service provider during security file generation, security file identification generation, and initial sequence scrambling; and
   requiring a user to connect to the secure service provider during object authentication.

10. The method as defined in claim 1, further comprising encoding the security file identification and the scrambled sequence in one or more security deterrents.

11. The method as defined in claim 1 wherein each step is performed using a secure service provider, and wherein the method further comprises descrambling the scrambled sequence directly from the security file identification if the secure service provider is used.

12. The method as defined in claim 1 wherein each of the metadata fields and the information field includes at least two blocks, and wherein scrambling the initial sequence includes:
   scrambling at least one of the at least two blocks of each of the metadata fields and the information field;
   swapping the at least two blocks within at least one of the fields; and
   scrambling the metadata fields and the information field.

13. A system for enhancing security printing, the system comprising:
   a computer or a computing system; and
   a processing device of the computer or computing system that executes:
      a program for generating a security file having a plurality of metadata fields and an information field concatenated together in an initial sequence;
      a one-way function for generating a security file identification from the plurality of metadata fields and the information field, wherein the security file identification corresponds to the initial sequence;
      a program that provides a look up table for selecting a custom scrambling technique based on the security file identification; and
      a program for scrambling the initial sequence of the plurality of metadata fields and the information field using the custom scrambling technique, thereby creating a scrambled sequence of the plurality of metadata field and the information field.

14. The system as defined in claim 13, further comprising a program, executed by the processing device, for generating the information field by extracting information from the plurality of metadata fields.

15. The system as defined in claim 13, further comprising a program, executed by the processing device, for at least one of hashing, digesting, or encrypting the plurality of metadata fields and the information field prior to scrambling or subsequent to scrambling.

16. The system as defined in claim 13, further comprising a program, executed by the processing device, for appending the security file identification to the information field.

17. The system as defined in claim 13, further comprising an electronic device for printing the security file identification and the scrambled sequence at one or more predetermined locations on an object.

18. The system as defined in claim 17, further comprising an authenticating system for authenticating the object, including:
   a device for reading the security file identification;
   hardware and software for determining the custom scrambling technique from the security file identification; and
   hardware and software for descrambling the scrambled sequence of the plurality of metadata fields and the information field, thereby revealing the initial sequence of the plurality of metadata fields and the information field.

19. The system as defined in claim 18 wherein the plurality of metadata fields and the information field prior are encrypted, and wherein the authenticating system further comprises hardware and software for decrypting the encrypted plurality of metadata fields and information field.

20. The system as defined in claim 13, further comprising an encoder or encoding system for encoding the security file identification and the scrambled sequence in one or more security deterrents.

21. The system as defined in claim 13 wherein at least one of the plurality of metadata fields includes operator information, forensic information, institutional information, or combinations thereof.

22. The system as defined in claim 13 wherein the program for generating, the one-way function, the program that provides the look up table, and the program for scrambling are accessible to a user via a secure service provider.

23. A computer-readable medium encoded with a data structure for enhancing security printing, comprising:

computer readable code for generating a security file having a plurality of metadata fields and an information field concatenated together in an initial sequence;

computer readable code for generating a security file identification from the plurality of metadata fields and the information field, wherein the security file identification corresponds to the initial sequence;

computer readable code for selecting a custom scrambling technique based on the security file identification; and computer readable code for scrambling the initial sequence of the plurality of metadata fields and the information field using the custom scrambling technique, thereby creating a scrambled sequence of the plurality of metadata field and the information field.

24. The method as defined in claim 1 wherein each of the generating, the selecting, and the scrambling are performed via a processing device executing computer readable code embodied on a computer-readable medium.

* * * * *